Oct. 7, 1924.
M. ROBERTS,
SELF FILLING PEN FOR DRAWING COMPASSES
Filed May 27, 1924
1,510,749
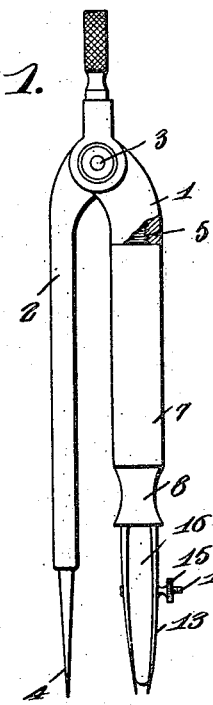
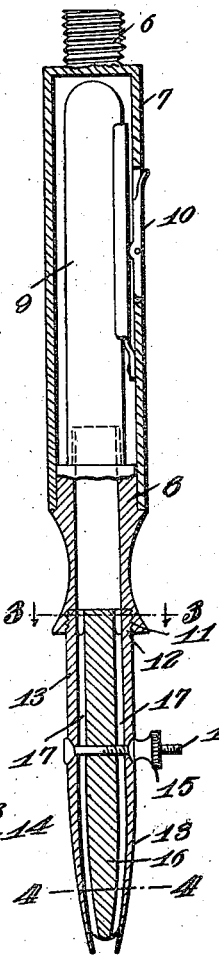
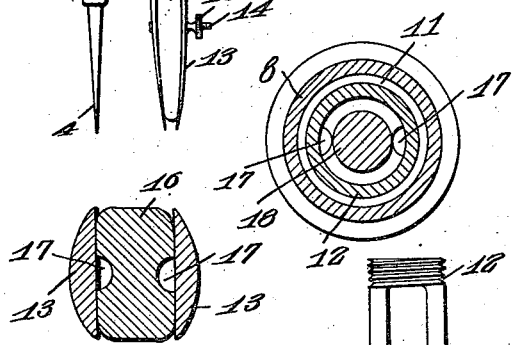
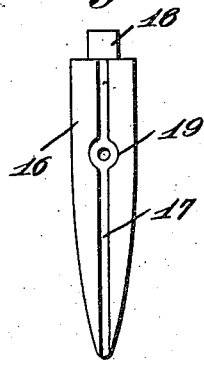
M. Roberts,
Inventor Patented Oct. 7, 1924.

1,510,749

UNITED STATES PATENT OFFICE.

MATTHEW ROBERTS, OF ALDEN, IOWA.

SELF-FILLING PEN FOR DRAWING COMPASSES.

Application filed May 27, 1924. Serial No. 716,198.

*To all whom it may concern:*

Be it known that I, MATTHEW ROBERTS, a citizen of the United States, residing at Alden, in the county of Hardin and State of Iowa, have invented a new and useful Self-Filling Pen for Drawing Compasses, of which the following is a specification.

This invention relates to a self filling pen for use in connection with a drawing compass.

One of the objects of the invention is to provide a pen which can be filled in the same manner as an ordinary fountain pen and which has a filler interposed between and cooperating with the bows of the pen so that ink will be properly fed along the bows to the point thereof.

A further object is to provide a pen of this character which can be filled readily and the bows of which can be quickly and accurately adjusted relative to each other.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is an elevation of a compass having the present improvements combined therewith.

Fig. 2 is an enlarged longitudinal section through the pen used in connection with the compass.

Fig. 3 is an enlarged section on line 3—3, Fig. 2.

Fig. 4 is an enlarged section on line 4—4, Fig. 2.

Fig. 5 is an elevation of the filler removed from between the bows.

Fig. 6 is an elevation of the bows detached from the balance of the pen.

Referring to the figures by characters of reference 1 and 2 designate the arms of a drawing compass suitably connected as at 3 and the arms 2 being provided with a point 4 for use as a centering point. Arm 1 has a screw threaded socket 5 in its end for the reception of a threaded stud 6 provided at one end of a cylindrical housing 7 constituting the body of the pen. The other end of the housing is closed by a tubular plug 8 to the other end of which is connected an ink bag 9 adapted to be collapsed by any suitable means such as a lever 10 and which can be of the usual construction employed in filling a fountain pen. The outer end of the plug 8 has a screw threaded socket 11 into which may be screwed a ring 12 having diametrically opposed bows 13 extending therefrom. An adjusting screw 14 extends transversely through the bows between their ends and is engaged by a nut 15 whereby said bows can be adjusted toward or from each other as usual.

Interposed between the bows is a filler 16 preferably of rubber and which has opposed longitudinal grooves 17 bridged by the respective bows 13. That portion of the filler extending into the ring 12 is reduced annularly to provide a neck 18 which is supported concentric with but spaced from the ring. The screw 14 is extended through the filler 16 and where this screw intersects the grooves 17 they are enlarged, as shown at 19 in Fig. 5.

When it is desired to fill the pen the bows 13 and the filler are removed from the plug 8 by unscrewing ring 12. The pen is then filled in the same manner as an ordinary fountain pen after which the ring 12 is reinserted in the plug 8. By means of the nut 15 the bows 13 can be adjusted toward each other so as to bring the points as close together as desired. The grooves 17 will remain open at all times and this will allow a supply of ink to flow along one or both of the grooves to the space between the points of the bows.

What is claimed is:—

1. The combination with a drawing compass having a short arm, of a tubular housing detachably connected to said arm, a tubular plug closing one end of the housing, a collapsible ink container within the housing and communicating with the plug, bows detachably connected to the plug, a filler between the bows and having longitudinal grooves extending along the bows, said grooves opening into the plug, and means for adjusting the bows relative to each other with the filler between them.

2. The combination with a drawing compass, of a tubular housing carried by one arm of the compass, a tubular plug closing one end of the housing, a collapsible ink container within the housing communicating with the plug, bows detachably connected to and extending from the plug, a filler interposed between the bows and having a neck projecting into the plug, there being longitudinal grooves in the filler and extending along the respective bows, said grooves opening into the plug, and means for adjusting the bows relative to each other with the filler interposed therebetween.

3. A drawing compass having a tubular housing, a tubular plug extending from one end of the housing, a collapsible ink container within the housing and communicating with the plug, a ring detachably mounted in the plug, bows extending therefrom, a filler interposed between the bows and having longitudinal grooves along the bows, said grooves opening into the plug, and means for adjusting the bows relative to each other.

In testimony that I claim the foregoing as my own, I have hereto affixed my signature in the presence of two witnesses.

MATTHEW ROBERTS.

Witnesses:
  B. R. BRYSON,
  FRED ROBERTS.